United States Patent
Takata et al.

(10) Patent No.: US 11,776,511 B2
(45) Date of Patent: Oct. 3, 2023

(54) KEYBOARD DEVICE

(71) Applicant: Roland Corporation, Shizuoka (JP)

(72) Inventors: Yukihide Takata, Shizuoka (JP); Hitoshi Sato, Shizuoka (JP); Masaki Kasubuchi, Shizuoka (JP); Mutsuo Sawada, Shizuoka (JP)

(73) Assignee: Roland Corporation, Shizuoka (JP)

( * ) Notice: Subject to any disclaimer, the term of this patent is extended or adjusted under 35 U.S.C. 154(b) by 0 days.

(21) Appl. No.: 17/784,108

(22) PCT Filed: Dec. 18, 2019

(86) PCT No.: PCT/JP2019/049591
§ 371 (c)(1),
(2) Date: Jun. 10, 2022

(87) PCT Pub. No.: WO2021/124476
PCT Pub. Date: Jun. 24, 2021

(65) Prior Publication Data
US 2023/0016374 A1    Jan. 19, 2023

(51) Int. Cl.
*G10C 3/16*   (2019.01)
*G06F 3/023*  (2006.01)
*G10C 3/12*   (2006.01)

(52) U.S. Cl.
CPC ............... *G10C 3/16* (2013.01); *G06F 3/023* (2013.01); *G10C 3/12* (2013.01)

(58) Field of Classification Search
CPC .................................... G10C 3/16; G10C 3/12
See application file for complete search history.

(56) References Cited

U.S. PATENT DOCUMENTS

2023/0016374 A1*  1/2023  Takata .................... G06F 3/023
2023/0029113 A1*  1/2023  Kasubuchi ............... G10C 1/00

FOREIGN PATENT DOCUMENTS

| JP | S6019090    | 2/1985 |
| JP | S62128719   | 6/1987 |
| JP | H02167594   | 6/1990 |
| JP | 2003145575  | 5/2003 |

(Continued)

OTHER PUBLICATIONS

"International Search Report (Form PCT/ISA/210) of PCT/JP2019/049591", dated Feb. 25, 2020, with English translation thereof, pp. 1-4.

(Continued)

*Primary Examiner* — Robert W Horn
(74) *Attorney, Agent, or Firm* — JCIPRNET

(57) ABSTRACT

Provided is a keyboard device that can suppress a reduction in the operability of a key. A rear guiding member comprises a pair of guiding surfaces that, in a side view of a key, face forward and rearward and are formed along an arc that is convex toward the front. The key comprises a pair of sliding surfaces that slide against the pair of guiding surfaces. Due to this sliding of the guiding surfaces and the sliding surfaces, rotation of the key can be guided while displacement of the key in the front-rear direction is regulated. Consequently, because forward and rearward displacement of the key during key pressing can be suppressed, a reduction in operability (feeling of touch) during pressing of the key can be suppressed.

20 Claims, 9 Drawing Sheets

(56) References Cited

FOREIGN PATENT DOCUMENTS

| | | | |
|---|---|---|---|
| JP | 2014048436 | | 3/2014 |
| JP | 2015060114 A | * | 3/2015 |

OTHER PUBLICATIONS

"Written Opinion of the International Searching Authority (Form PCT/ISA/237) of PCT/JP2019/049591," dated Feb. 25, 2020, with English translation thereof, pp. 1-6.

* cited by examiner (a)

(b)

(c)

(a)

(b)

(a)

(b)

(a)

(b)

(c)

KEYBOARD DEVICE

CROSS-REFERENCE TO RELATED APPLICATION

This application is a 371 application of the International PCT application serial no. PCT/JP2019/049591, filed on Dec. 18, 2019. The entirety of the above-mentioned patent application is hereby incorporated by reference herein and made a part of this specification.

TECHNICAL FIELD

The disclosure relates to a keyboard device, and more particularly to a keyboard device that can suppress a reduction in the operability of a key.

RELATED ART

As shown in FIG. 1 of Patent Literature 1, the rotation center 2 of the key of an acoustic piano is located on the rear end side relatively far from the front end (player side) of the key. In addition, Patent Literature 1 describes a keyboard instrument that rotates a key along an arc surface of a rotation support part 27, as shown in FIG. 2. In this keyboard instrument, the center O of the arc surface of the rotation support part 27 (that is, the rotation center O of the key) is located sufficiently behind the rear end of the key; therefore, the rotation trajectory of the key can be approximated to that of an acoustic piano key.

CITATION LIST

Patent Literature

[Patent Literature 1] Japanese Patent Lain-Open No. H02-167594 (for example, lines 2 to 17 in column 5 on page 2 and FIGS. 1 and 2).

SUMMARY

Technical Problem

However, in the above-described conventional technique, since it is configured that the key is pressed against the rotation support part 27 by the elastic force of the return spring 35, when a force against the elastic force of the return spring 35 acts on the key, the key may be displaced to the front side. Therefore, there is a problem that the operability (feeling of touch) of the key may be reduced.

The disclosure has been in view of the above, and the disclosure provides a keyboard device that can suppress a reduction in the operability of a key.

Solution to Problem

In order to achieve the above, a keyboard device of the disclosure includes: a guiding member; and multiple keys whose rotational movement is guided by the guiding member. The guiding member includes a pair of guiding surfaces that, in a side view of the key, face forward and rearward and are formed along an arc convex to the front. The key includes a pair of sliding surfaces configured to be slidable on the pair of guiding surfaces. A rotation of the key is guided in a state where a displacement of the key in a front-rear direction is regulated by sliding of the guiding surfaces and the sliding surfaces.

DESCRIPTION OF THE EMBODIMENTS

Figure 1:
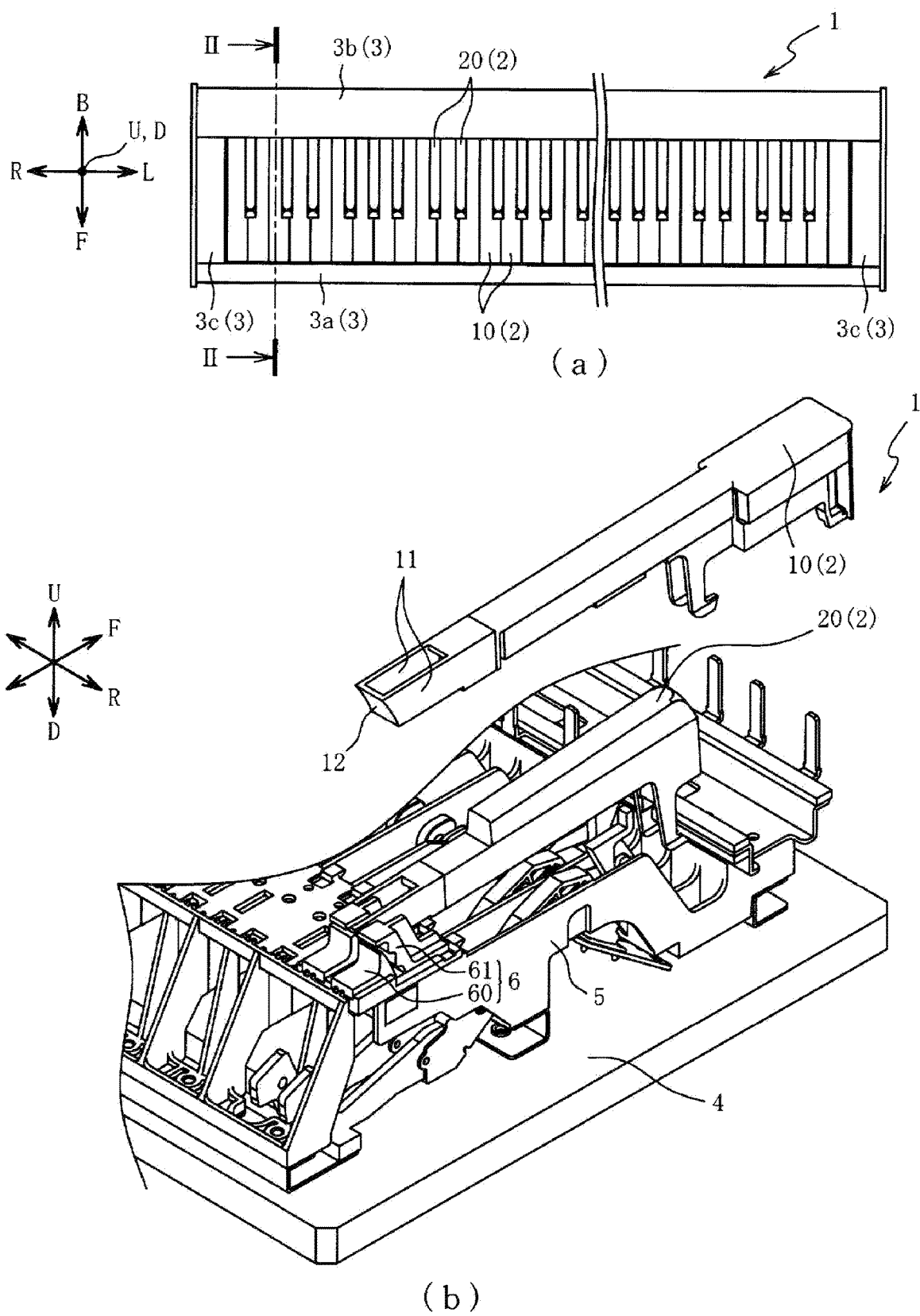
In FIG. 1, (a) is a top view of the keyboard device according to the first embodiment, and (b) is a perspective view of the keyboard device.

Hereinafter, exemplary embodiments will be described with reference to the accompanying drawings. First, with reference to FIG. 1, the overall configuration of a keyboard device 1 of a first embodiment will be described. In FIG. 1, (a) is a top view of the keyboard device 1 according to the first embodiment, and (b) is a perspective view of the keyboard device 1.

In (b) of FIG. 1, a part of the keyboard device 1 (for example, a part of multiple keys 2 and a panel 3) is not shown. Further, the arrows U-D direction, F-B direction, and L-R direction in FIG. 1 indicate the up-down direction, the front-rear direction, and the left-right direction of the keyboard device 1, respectively, and the same applies to the subsequent drawings.

As shown in (a) of FIG. 1, the keyboard device 1 is configured as a keyboard instrument (electronic piano) including multiple (88 in this embodiment) keys 2 formed of a resin material, and a panel 3 surrounding the multiple keys 2. The key 2 includes multiple (52 in this embodiment) white keys 10 for playing a trunk sound, and multiple (36 in this embodiment) black keys 20 for playing a derivative sound.

The multiple white keys 10 and black keys 20 are provided side by side in the left-right direction (arrow L-R direction).

The panel 3 includes a front panel 3a, a back panel 3b disposed to face the front panel 3a in the front-rear direction (arrow F-B direction), and a pair of end panels 3c connecting the left and right ends of the front panel 3a and the back panel 3b. The white keys 10 and the black keys 20 are surrounded by the front panel 3a, the back panel 3b, and the pair of end panels 3c.

On the upper surface of the back panel 3b, for example, a display device formed of an LED, a liquid crystal display, or the like for displaying various states, and multiple operators for adjusting the volume, changing modes, and the like are provided (none of them are shown). Further, on the back surface of the back panel 3b, for example, a power switch, multiple jacks for inputting and outputting MIDI signals and audio signals, and the like are provided (none of them are shown).

As shown in (b) of FIG. 1, the keyboard device 1 is provided with a plate-shaped chassis 4 formed of a synthetic resin, a steel plate, or the like extending in the left-right direction (arrow L-R direction). A base member 5 for supporting the key 2 is fixed to the upper surface of the chassis 4.

A rear guiding member 6 for guiding the rotation of the rear end part of the key 2 is fixed to the upper surface on the rear end side (arrow B side) of the base member 5. The rear guiding member 6 includes a first guiding part 60 and a second guiding part 61 formed to protrude upward from the upper surface of the base member 5. The first guiding part 60 and the second guiding part 61 are spaced apart for a predetermined distance in the front-rear direction, and are provided with a gap for guiding the rotation of the key 2 between the first guiding part 60 and the second guiding part 61.

From the rear end parts of the white key 10 and the black key 20, a pair of plate-shaped base parts 11 that are spaced apart for a predetermined distance in the left-right direction protrude rearward. A sliding part 12 protrudes inward in the left-right direction from the tip end (rear end) of the pair of base parts 11, and the pair of base parts 11 are connected to each other by the sliding part 12. The base part 11 and the sliding part 12 are each formed in a plate shape.

The first guiding part 60 and the second guiding part 61 are configured to be detachable from the base member 5, and the first guiding part 60 and the second guiding part 61 are fixed to the base member 5 with the sliding part 12 sandwiched in the gap between the first guiding part 60 and the second guiding part 61, whereby the rear end parts of the white key 10 and the black key 20 are rotatably supported by the base member 5.

Figure 2:
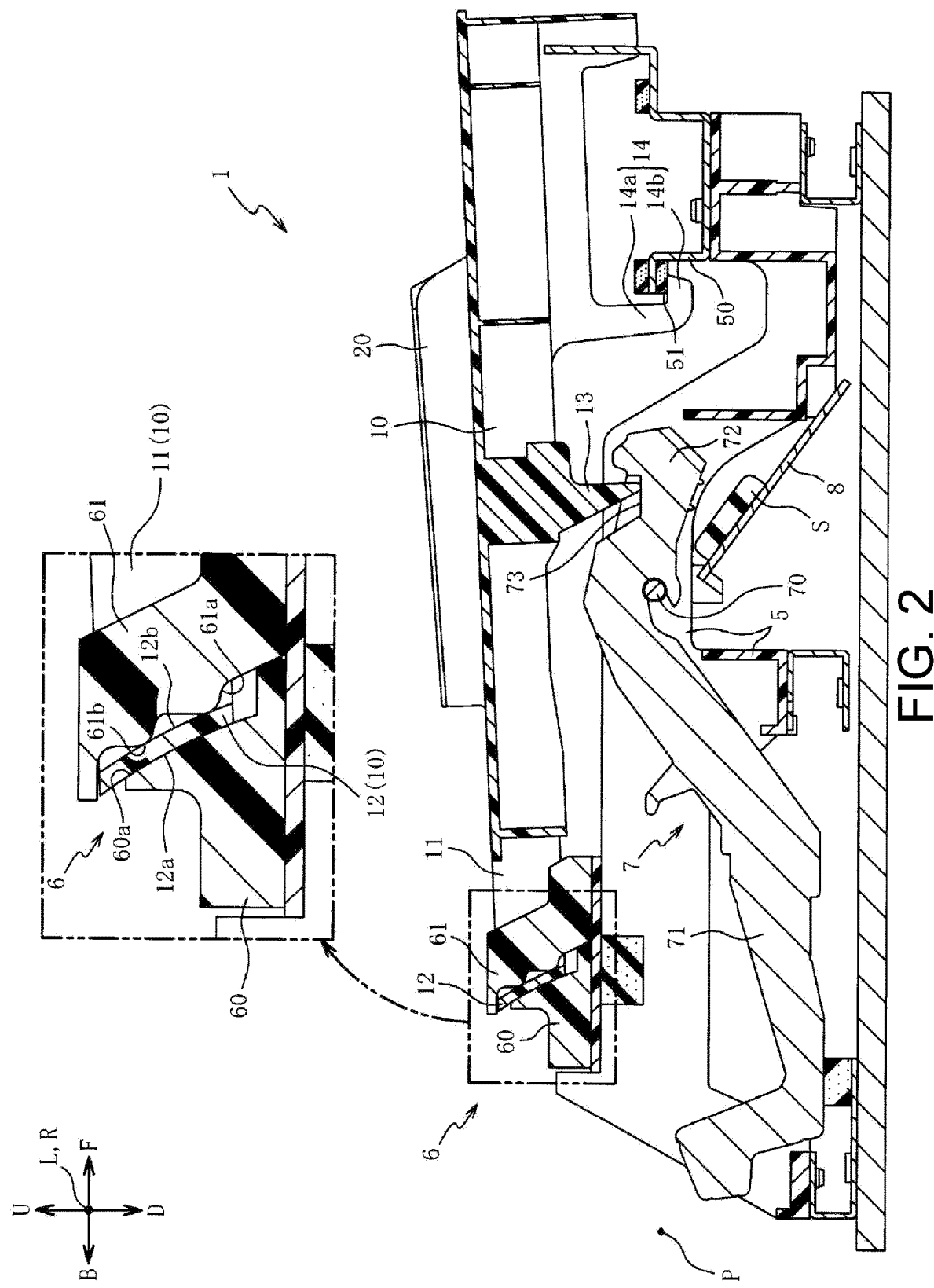
FIG. 2 is a cross-sectional view of the keyboard device taken along the line II-II in (a) of FIG. 1.
Figure 3:
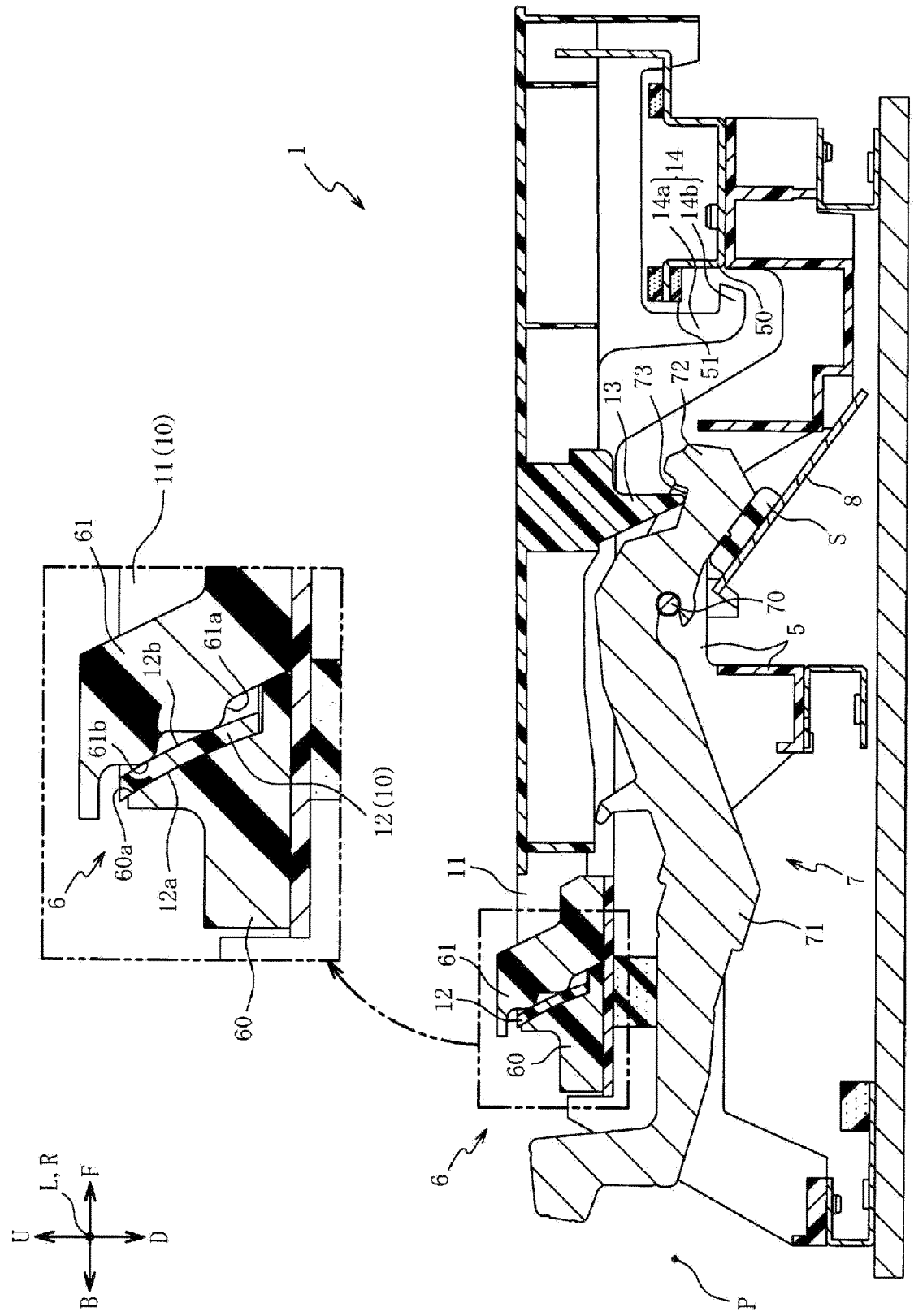
FIG. 3 is a cross-sectional view of the keyboard device showing a state in which the white key is pressed from the state of FIG. 2.

Next, the detailed configuration of the keyboard device 1 will be described with reference to FIGS. 2 and 3. FIG. 2 is a cross-sectional view of the keyboard device 1 taken along the line II-II in (a) of FIG. 1. FIG. 3 is a cross-sectional view of the keyboard device 1 showing a state in which the white key 10 is pressed from the state of FIG. 2. In addition, in FIG. 3, in order to simplify the drawing, the illustration of a part of the keyboard device 1 (for example, the black key 20) is omitted.

In the following description, the configuration of the white key 10 will be described, but the configuration in which a hammer 7 is rotated in conjunction with the key pressing or key releasing of the white key 10, and the configuration in which the displacement of the white key 10 is guided by the rotation of the hammer 7 or the sliding of the sliding part 12 are substantially the same for the black key 20. Therefore, the actions and effects of the configurations of the white key 10 described below are similarly exhibited in the black key 20.

As shown in FIGS. 2 and 3, the rear guiding member 6 of the keyboard device 1 includes a guiding surface 60a formed on the front surface (the surface on the arrow F side) of the first guiding part 60 (see the enlarged parts of FIGS. 2 and 3), and a guiding surface 61a formed on the rear surface of the second guiding part 61 (the surface on the arrow B side). The guiding surface 60a is formed in an arc shape convex to the front side in a side view, and the guiding surface 61a is provided with a convex part 61b protruding toward the rear side. Multiple (two in this embodiment) convex parts 61b are provided side by side from the upper end side of the guiding surface 61a.

The facing distance between the guiding surface 60a and the convex part 61b is set to be equal to (or slightly greater than) the plate thickness of the sliding part 12, and the sliding part 12 is slidably inserted between the guiding surface 60a and the convex part 61b. That is, the rear surface of the sliding part 12 is configured as a sliding surface 12a that slides along the guiding surface 60a, and the front surface of the sliding part 12 is configured as a sliding surface 12b that slides along the top of the convex part 61b of the guiding surface 61a.

As a result, when the white key 10 is pressed (see FIG. 3), the rotation of the white key 10 can be guided in a state where the displacement of the white key 10 to the rear side (arrow B side) is regulated by the sliding between the guiding surface 60a and the sliding surface 12a. Further, the rotation of the white key 10 can be guided in a state where the displacement of the white key 10 toward the front side (arrow F side) is regulated by the sliding between the guiding surface 61a (convex part 61b) and the sliding surface 12b. Consequently, because forward and rearward displacement of the white key 10 during pressing can be suppressed, a reduction in operability (feeling of touch) during key pressing of the white key 10 can be suppressed.

The hammer 7 is rotatably connected to a substantially central part of the base member 5 in the front-rear direction around a shaft 70 along the left-right direction (arrow L-R direction). The hammer 7 includes a mass part 71 for giving a feeling when the white key 10 is pressed, and a pressing part 72 for pressing a switch S when the white key 10 is pressed.

In the hammer 7, the part on the rear side (arrow B side) of the shaft 70 is the mass part 71, and the part on the front side (arrow F side) of the shaft 70 is the pressing part 72. A receiving part 73 recessed downward is formed on the upper surface of the pressing part 72.

A protruding part 13 is formed to protrude downward from the lower surface of the white key 10, and the lower end of the protruding part 13 is in contact with the bottom surface of the receiving part 73 of the hammer 7. The bottom surface of the receiving part 73 is configured as a sliding surface on which the lower end of the protruding part 13 slides in the front-rear direction. Therefore, when the white key 10 is pressed (see FIG. 3), the protruding part 13 of the white key 10 slides along the bottom surface of the receiving part 73, whereby the hammer 7 rotates around the shaft 70, and the rotation of the hammer 7 causes the mass part 71 to be displaced to be lifted. Since the mass part 71 has a weight sufficient to provide the feeling of key pressing, the reaction force accompanying the rotation of the hammer 7 provides the player the feeling of pressing the white key 10.

In addition, when the white key 10 is pressed, the pressing part 72 is displaced downward, and since a substrate 8 having the switch S on the upper surface is provided below the pressing part 72, when the white key 10 is pressed, the switch S is pushed by the pressing part 72. The key pressing information (note information) of the white key 10 is detected by the on/off operation of the switch S, and a musical note signal based on the detection result is output to the outside.

The state in which the switch S is pushed by the pressing part 72 (the state shown in FIG. 3) is the end position of the key pressing of the white key 10, and when the white key 10 is released from the end position of the key pressing, the weight of the mass part 71 of the hammer 7 causes the hammer 7 to rotate to return to the initial position (state in FIG. 2). When the hammer 7 is rotated, the protruding part 13 is lifted while sliding along the bottom surface of the receiving part 73, so that a return force for returning the white key 10 to the initial position is applied. The upward displacement of the white key 10 due to this return force is regulated by a key release stopper 14.

The key release stopper 14 includes a protruding part 14a protruding downward from the lower surface of the white key 10 and a bent part 14b bent in a direction (the front side in this embodiment) perpendicular to the protruding direction of the protruding part 14a. A stopper member 50 is fixed to the upper surface of the base member 5 on the front end side, and a cushioning material 51 is adhered to the stopper member 50 at a position facing the bent part 14b in the up-down direction. Therefore, when the bent part 14b of the key release stopper 14 comes into contact with the cushioning material 51, the upward displacement of the white key 10 at the time of key releasing is regulated.

As described above, the rotation of the white key 10 at the time of key releasing or key pressing is guided by the rear guiding member 6, and the rear guiding member 6 also has a function of regulating the left-right displacement of the white key 10. That is, the second guiding part 61 of the rear guiding member 6 is housed in a space surrounded by the pair of base parts 11 and the sliding part 12 of the white key 10, and the left-right dimension of the second guiding part 61 is set to be equal to (or slightly less than) the facing distance between the pair of base parts 11.

Thereby, the displacement of the base part 11 in the left-right direction can be regulated by the second guiding part 61. In other words, the second guiding part 61 of the rear guiding member 6 has a function of guiding the rotation of the white key 10 and a function as a regulating part for regulating the displacement of the base part 11 in the left-right direction. Therefore, the number of parts can be reduced.

Here, the center of rotation of the key of the acoustic piano is disposed at a position relatively distant from the upper surface of the key (the area where the key can be pressed) to the rear lower side; however, in the following description, the center of rotation will be defined as a reference point P.

The reference point P in the white key 10 (black key 20) is a point located on the rear lower side of the sliding part 12 (sliding surfaces 12a and 12b) in the side view of the white key 10, and is a point located at a position where the distance from the front end of the upper surface of the white key 10 in the initial state is 200 mm or more and 500 mm or less to the rear side in the horizontal direction and 0 mm or more and 100 mm or less to the lower side in the vertical direction.

The guiding surface 60a of the rear guiding member 6 and the sliding surfaces 12a and 12b of the white key 10 are formed in an arc shape centered on the reference point P. Further, the tops of the multiple convex parts 61b formed on the guiding surface 61a are each located on an arc centered on the reference point P. In this way, by the sliding between the guiding surfaces 60a and 61a (convex part 61b) and the sliding surfaces 12a and 12b, the entire white key 10 can be rotated around the reference point P; therefore, the rotation trajectory of the white key 10 can be made the same as the key of an acoustic piano.

Since the sliding surfaces 12a and 12b are formed on an arc centered on the reference point P, the sliding part 12 can be formed in a shape having no undercut for mold release in the up-down direction.

That is, in the conventional technique (Japanese Patent Laid-Open Publication No. H02-167594), the sliding surface (rotating fulcrum part 23) of the key is formed in an arc shape centered on a reference point (center O of the rotating fulcrum part 23) located at a position overlapping the sliding surface in the front-rear direction. In such a configuration, the sliding surface has a shape with an undercut, which makes it difficult to release the key from the mold simply in the up-down direction; therefore, the manufacturing cost of the mold is increased (a slide core is required in addition to the upper and lower molds).

In contrast, in this embodiment, the sliding surfaces 12a and 12b formed on the front surface and the rear surface of the sliding part 12 are formed in an arc shape centered on the reference point P located on the rear lower side of the sliding part 12. As a result, undercuts for the release of the white key 10 in the up-down direction are not formed on the sliding surfaces 12a and 12b (sliding part 12), and the manufacturing cost of the mold when molding the white key 10 can be reduced.

Here, for example, if the purpose is simply to guide the sliding of the sliding part 12, the guiding surface 61a may be formed in an arc shape centered on the reference point P, similarly to the guiding surface 60a. However, in such a configuration, the contact area at the time of sliding becomes large, so the shape of the arc surface needs to be accurate accordingly. In other words, in order to make the sliding of arc surfaces smooth, it is necessary to match the surface shapes of each other, but since it is difficult to achieve the accuracy of such arc surfaces, rattling is likely to occur during sliding.

In this regard, in this embodiment, the sliding surface 12b is formed in an arc shape convex to the front side in the side view, and multiple convex parts 61b that slide along the sliding surface 12b are formed on the guiding surface 61a. As a result, the contact area of the guiding surface 61a with respect to the sliding surface 12b can be reduced as compared with the case where both the guiding surface 61a and the sliding surface 12b are arc surfaces. Therefore, since the sliding surface 61a (convex part 61b) and the sliding surface 12b can be smoothly slid, a reduction in operability (feeling of touch) during key pressing of the white key 10 can be suppressed.

Next, the second to seventh embodiments will be described with reference to FIGS. 4 to 8. In the second to seventh embodiments described below, the configurations of the white keys 210, 410, 510, 610, and 710 will be described, but the actions and effects of such configurations are similarly exhibited in the black key 20.

Figure 4:
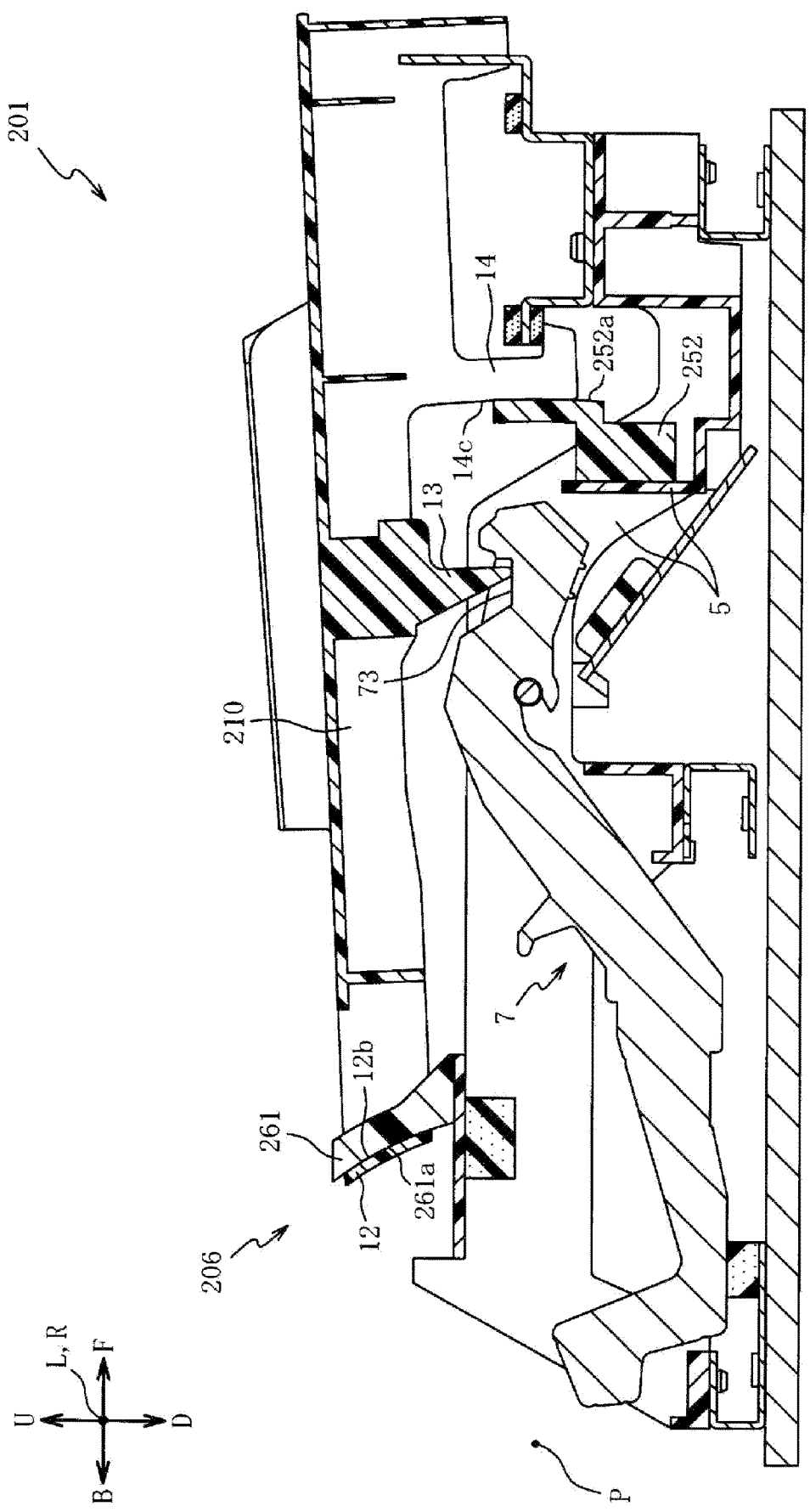
FIG. 4 is a cross-sectional view of the keyboard device according to the second embodiment.

First, a keyboard device 201 of the second embodiment will be described with reference to FIG. 4. The same parts as those in the first embodiment described above are designated by the same reference numerals, and the description thereof will be omitted. FIG. 4 is a cross-sectional view of the keyboard device 201 according to the second embodiment.

As shown in FIG. 4, a rear guiding member 206 of the keyboard device 201 of the second embodiment includes only a second guiding part 261 while the first guiding part 60 (see FIG. 3) of the first embodiment is omitted. The second guiding part 261 has the same configuration as the second guiding part 61 of the first embodiment except that a guiding surface 261a on the rear surface (the surface on the arrow B side) is formed in an arc shape centered on the reference point P (the convex part 61b is omitted). Therefore, the rotation of the white key 210 on the rear end side is guided by the sliding of the sliding part 12 (sliding surface 12b) along the guiding surface 261a of the second guiding part 261.

In addition, the rotation of the white key 210 on the front end side (arrow F side) is guided by a front guiding member 252. The front guiding member 252 is fixed to the base member 5 on the front side of the hammer 7, and the front surface of the front guiding member 252 is configured as a guiding surface 252a.

A sliding surface 14c, which is the rear surface of the key release stopper 14, is in contact with the guiding surface 252a, and the guiding surface 252a and the sliding surface 14c are each formed in an arc shape centered on the reference point P.

As described above, in the second embodiment, the rotation of the white key 210 can be guided in a state where the displacement of the white key 210 in the front-rear direction is regulated by the sliding of the guiding surfaces 261a and 252a and the sliding surfaces 12b and 14c. Consequently, a reduction in operability (feeling of touch) during key pressing of the white key 210 can be suppressed.

Further, the guiding surface 261a of the rear guiding member 206 is located on the rear end side of the white key 210, and the guiding surface 252a of the front guiding member 252 is located on the front end side (closer to the front with respect to the center in the front-rear direction) of the white key 210. As a result, as compared with the first embodiment, the rotation of the white key 210 can be guided at two points separated from each other in the front-rear direction; therefore, the rotation of the white key 210 can be smoothly guided. Consequently, a reduction in operability (feeling of touch) during key pressing of the white key 210 can be suppressed.

Then, by making the rear surface of the key release stopper 14 be the sliding surface 14c, the key release stopper 14 has a function of regulating the displacement of the white key 210 at the time of key releasing and a function of guiding the rotation of the white key 210 on the front end side. Therefore, the number of parts can be reduced.

Here, since the return force of the hammer 7 is applied to the white key 210 from the contact position between the receiving part 73 and the protruding part 13, when the white key 210 is pressed on the front side of the protruding part 13, the white key 210 tries to rotate with the contact position as a fulcrum (the rear end side of the white key 210 tries to be displaced upward). In this case, as in the first embodiment (see FIG. 3), if the guiding surfaces 60a and 61a and the sliding surfaces 12a and 12b are each located on the rear side of the protruding part 13, the rotation of the white key 210 with the above-described contact position as a fulcrum tends to cause rattling in the sliding between the guiding surfaces 60a and 61a and the sliding surfaces 12a and 12b.

In this regard, in this embodiment, the return force from the hammer 7 is applied to the white key 210 in the area between the pair of guiding surfaces 261a and 252a. As a result, even when the key is pressed on the front side of the contact position between the receiving part 73 and the protruding part 13, as compared with the configuration of the first embodiment, it is possible to suppress the occurrence of rattling in the sliding between the guiding surfaces 261a and 252a and the sliding surfaces 12b and 14c. Consequently, since the rotation of the white key 210 can be smoothly guided, a reduction in operability (feeling of touch) during key pressing of the white key 210 can be suppressed.

Figure 5:
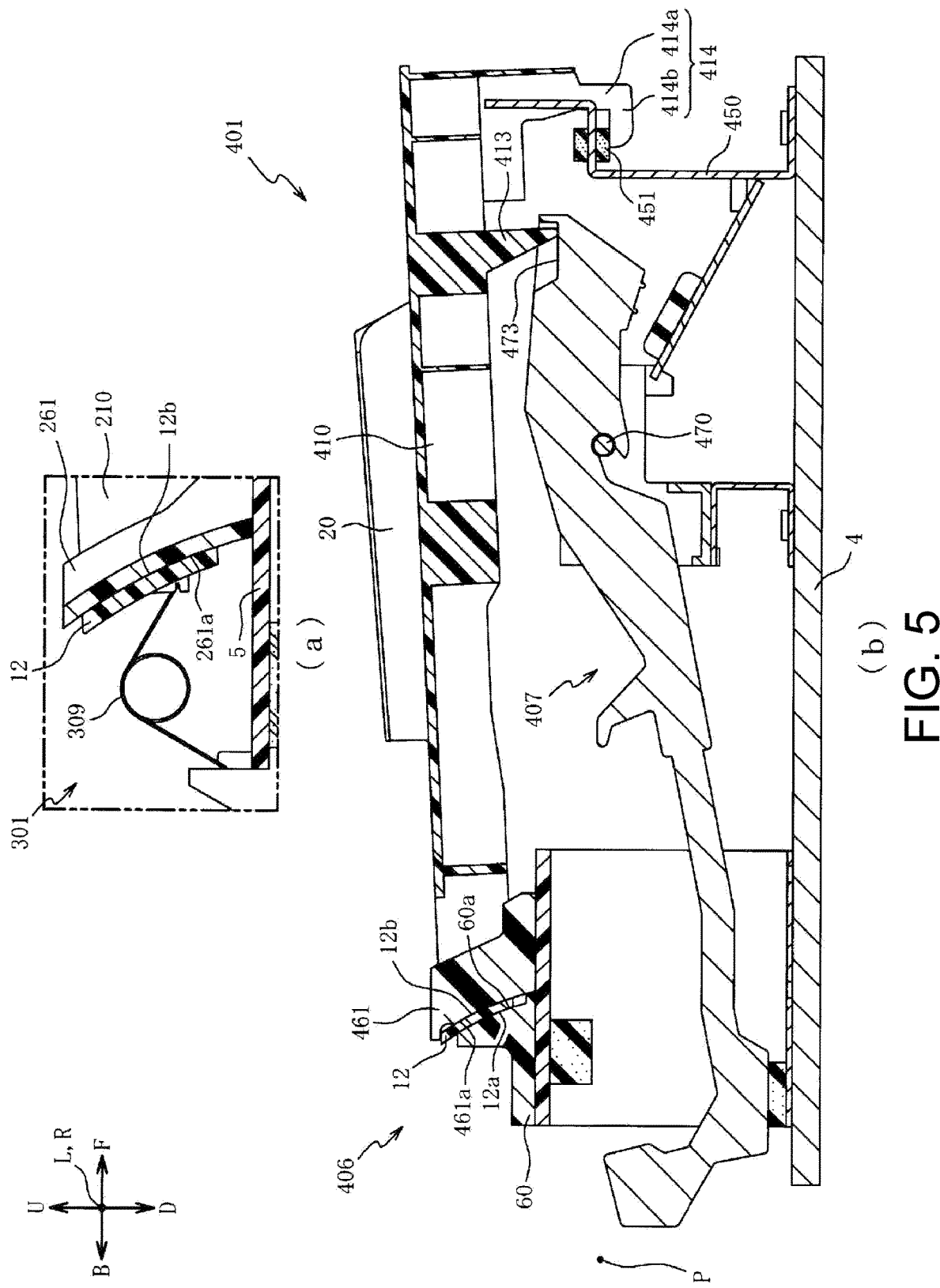
In FIG. 5, (a) is a partially enlarged cross-sectional view of a keyboard device according to the third embodiment, and (b) is a cross-sectional view of a keyboard device according to the fourth embodiment.

Next, the third and fourth embodiments will be described with reference to FIG. 5. The same parts as those of the above-described embodiments are designated by the same reference numerals, and the description thereof will be omitted. In FIG. 5, (a) is a partially enlarged cross-sectional view of a keyboard device 301 according to the third embodiment, and (b) is a cross-sectional view of a keyboard device 401 according to the fourth embodiment.

As shown in (a) of FIG. 5, the keyboard device 301 of the third embodiment has the same configuration as the keyboard device 201 of the second embodiment except that an elastic member 309 (a torsion coil spring in this embodiment) is added. The elastic member 309 is provided between the upper surface of the base member 5 and the rear surface of the sliding part 12, and the sliding part 12 (sliding surface 12b) of the white key 210 is pressed against the guiding surface 261a of the second guiding part 261 by the elastic force of the elastic member 309.

As a result, it is possible to suppress the occurrence of rattling when the sliding surface 12b is slid with respect to the guiding surface 261a. Consequently, since the rotation of the white key 210 can be smoothly guided, a reduction in operability (feeling of touch) during key pressing of the white key 210 can be suppressed.

Further, on the front end side of the white key 210, the guiding surface 252a of the front guiding member 252 (see FIG. 4) and the sliding surface 14c of the key release stopper 14 face each other in the front-rear direction. Therefore, when the pressing force of the sliding part 12 toward the guiding surface 261a is weakened (disappeared) due to deterioration of the elastic member 309 or the like, the rotation of the white key 210 can be guided in a state where the displacement of the white key 210 in the front-rear direction is regulated by the sliding of the guiding surfaces 261a and 252a and the sliding surfaces 12b and 14c. Consequently, a reduction in operability (feeling of touch) during key pressing of the white key 210 can be suppressed.

Further, in this embodiment, the guiding surface 252a (see FIG. 4) of the front guiding member 252 guides the displacement of the white key 210 on the front end side (the displacement of the white key 210 to the rear side is regulated); however, when the elastic member 309 is used, the front guiding member 252 may be omitted.

As shown in (b) of FIG. 5, a rear guiding member 406 of the keyboard device 401 of the fourth embodiment has the same configuration as the rear guiding member 6 of the first embodiment except that a guiding surface 461a of the second guiding part 461 is formed in an arc shape centered on the reference point P (the convex part 61b is omitted). Therefore, the rotation of the white key 410 is guided by the sliding of the sliding part 12 (sliding surfaces 12a and 12b) along the guiding surfaces 60a and 461a of the first guiding part 60 and the second guiding part 461.

A protruding part 413 of the white key 410 is located on the front side (front side of the front end of the black key 20) with respect to the center in the front-rear direction (arrow F-B direction) of the white key 410, and the key release stopper 414 is provided on the lower surface of the front end of the white key 410.

The key release stopper 414 includes a protruding part 414a protruding downward from the lower surface of the white key 410 and a bent part 414b bent in a direction (the rear side in this embodiment) perpendicular to the protruding direction of the protruding part 414a. A stopper member 450 is fixed to the upper surface of the chassis 4 on the front end side, and a cushioning material 451 is adhered to the stopper member 450 at a position facing the bent part 414b in the up-down direction. Therefore, when the bent part 414b of the key release stopper 414 comes into contact with the cushioning material 451, the upward displacement of the white key 410 at the time of key releasing is regulated.

A hammer 407 is pivotally supported by a shaft 470 located on the rear side with respect to the center of the white key 410 in the front-rear direction, and the protruding part 413 of the white key 410 contacts the bottom surface of a receiving part 473 located on the front side of the shaft 470.

Here, as described above, when the white key 410 is pressed on the front side of the contact position between the receiving part 473 and the protruding part 413, the white key 410 tries to rotate with the contact position as a fulcrum. However, in this embodiment, the contact position between the receiving part 473 and the protruding part 413 is located on the front side of the front end of the black key 20 (on the front side with respect to the center in the front-rear direction in the key-pressable area on the upper surface of the white key 410).

Specifically, the white key 410 includes a narrow part (a part located between the black keys 20) extending from the rear end to the front side and a wide part (a part located on the front side of the black keys 20) connected to the front end of the narrow part and having a larger left-right dimension than the narrow part (see FIG. 1). The contact position between the receiving part 473 and the protruding part 413 is located below the wide part of the white key 410.

As a result, the rear side of the contact position between the receiving part 473 and the protruding part 413 can be easily pressed; therefore, when the white key 410 is pressed, it is possible to suppress the rotation of the white key 410 with the contact position as a fulcrum. Therefore, it is possible to suppress the occurrence of rattling in the sliding between the guiding surfaces 60a and 461a and the sliding surfaces 12a and 12b.

Figure 6:
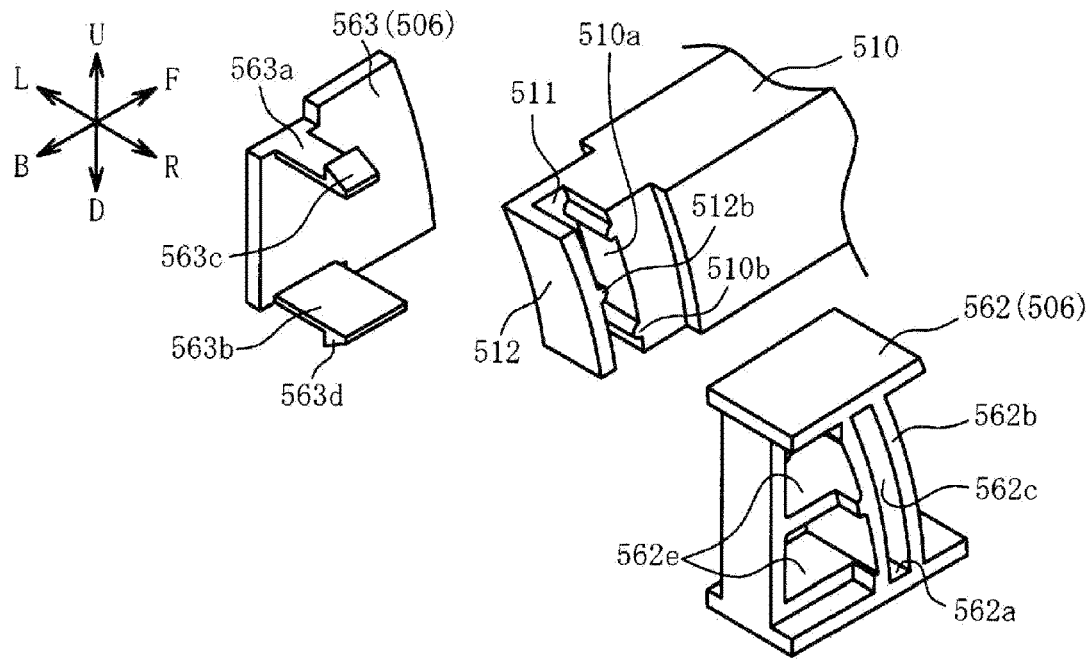
In FIG. 6, (a) is an exploded perspective view of a white key and a rear guiding member according to the fifth embodiment, and (b) is a perspective view of the white key and the rear guiding member, and (c) is a partially enlarged side view of the white key and the rear guiding member viewed in the direction of the arrow VIc in (b) of FIG. 6.
Figure 6:
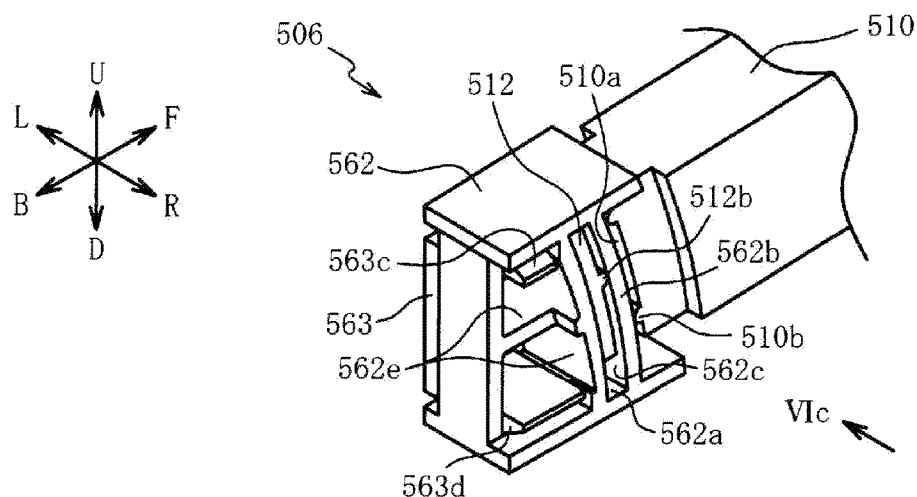
Figure 6:
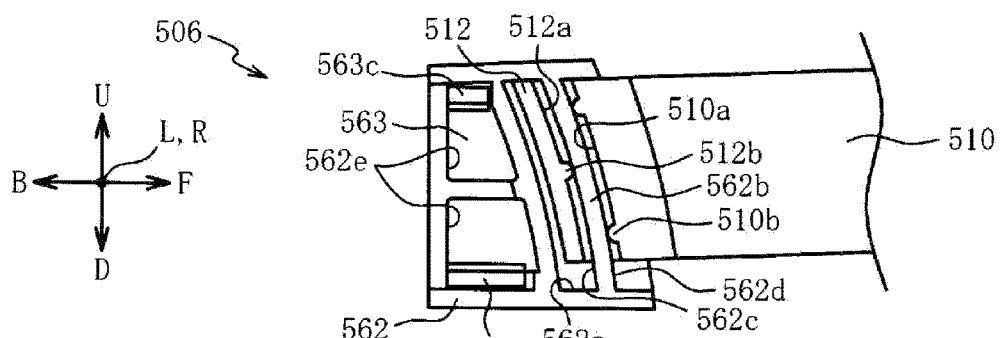

Next, the fifth embodiment will be described with reference to FIG. 6. In FIG. 6, (a) is an exploded perspective view of a white key 510 and a rear guiding member 506 according to the fifth embodiment, and (b) is a perspective view of the white key 510 and the rear guiding member 506, and (c) is a partially enlarged side view of the white key 510 and the rear guiding member 506 viewed in the direction of the arrow VIc in (b) of FIG. 6.

Note that FIG. 6 schematically shows the rear guiding member 506 and a part on the rear end side of the white key 510, and the illustration of other members (for example, the base member 5 that supports the rear guiding member and the white key, the hammer 7 that applies a return force to the white key, and the like) is omitted, and the same applies to FIGS. 7 to 9 described later.

As shown in FIG. 6, the base part 511 protrudes rearward from the rear end part (end part on the arrow B side) of the white key 510 of the fifth embodiment, and a sliding part 512 protrudes in the left-right direction (arrow L-R direction) from the tip end (rear end) of the base part 511. The front surface (the surface on the arrow F side) of the sliding part 512 is a sliding surface 512a (see (c) of FIG. 6), and the sliding surface 512a is formed in an arc shape convex to the front side. Further, a convex part 512b protruding toward the front side is formed in a substantially central part of the sliding surface 512a in the up-down direction (arrow U-D direction).

The rear end surface of the white key 510 (the surface facing the sliding surface 512a in the front-rear direction) is configured as the sliding surface 510a, and the sliding surface 510a is formed in an arc shape convex to the front side. Further, a convex part 510b is formed on the sliding surface 510a to protrude toward the rear side. Multiple (two in this embodiment) convex parts 510b are provided side by side from the upper end side of the sliding surface 510a.

The sliding surfaces 510a and 512a of the white key 510 slide with respect to the rear guiding member 506 to guide the rotation of the white key 510. The rear guiding member 506 includes a main body part 562 into which the sliding part 512 of the white key 510 is inserted, and a fixing part 563 for fixing the white key 510 to the main body part 562.

By forming a through hole 562a penetrating to the left and right on the front end side of the main body part 562, an arc-shaped rib 562b extending in the up-down direction is formed in the main body part 562. The front surface and the rear surface of the rib 562b are configured as guiding surfaces 562c and 562d (see (c) of FIG. 6 for the guiding surface 562d). The guiding surfaces 562c and 562d are each formed in an arc shape convex to the front side.

By inserting the sliding part 512 of the white key 510 into the through hole 562a of the rear guiding member 506 (see (c) of FIG. 6), the convex part 510b of the sliding surface 510a can slide on the guiding surface 562d, and the convex part 512b of the sliding surface 512a can slide on the guiding surface 562c. As a result, the rotation of the white key 510 can be guided in a state where the displacement of the white key 510 in the front-rear direction is regulated; therefore, a reduction in operability (feeling of touch) during key pressing of the white key 510 can be suppressed.

The guiding surfaces 562c and 562d are formed in an arc shape centered on the above-described reference point P (see FIGS. 2 and 3). Further, the tops of the convex parts 510b and 512b are each located on an arc centered on the reference point P. In this way, the entire white key 510 can be rotated around the reference point P; therefore, the rotation trajectory of the white key 510 can be made the same as the key of an acoustic piano.

Further, since it is configured that the convex parts 510b and 512b formed on the sliding surfaces 510a and 512a are slid along the guiding surfaces 562c and 562d, compared with the case of sliding between arc surfaces, the sliding surfaces 510a and 512a and the guiding surfaces 562c and 562d can be slid smoothly. Consequently, a reduction in operability (feeling of touch) during key pressing of the white key 510 can be suppressed.

As described above, in order to make the sliding between the sliding surfaces 510a and 512a and the guiding surfaces 562c and 562d smooth, it is preferable to reduce the number (contact area) of the convex parts 510b and 512b formed on the sliding surfaces 510a and 512a as much as possible. Therefore, in this embodiment, the convex parts 510b and 512b are alternately formed (alternately on the sliding surface 510a side and the sliding surface 512a side) from the upper end side to the lower end side of the sliding surfaces 510a and 512a.

That is, the convex part 510b of the sliding surface 510a and the convex part 512b of the sliding surface 512a are formed at different positions in the up-down direction (at a position where the convex part 510*b* and the convex part 512*b* do not overlap viewed in the protruding direction of the convex part 510*b*). Therefore, the sliding surfaces 510*a* and 512*a* and the guiding surfaces 562*c* and 562*d* can be smoothly slid while reducing the number of convex parts 510*b* and 512*b* formed.

In particular, in this embodiment, since it is configured that the three convex parts 510*b* and 512*b* formed on the sliding surfaces 510*a* and 512*a* are slid on the guiding surfaces 562*c* and 562*d*, the number of convex parts 510*b* and 512*b* formed can be minimized. Therefore, the sliding between the sliding surfaces 510*a* and 512*a* and the guiding surfaces 562*c* and 562*d* can be made smoother.

Further, in this embodiment, the convex parts 510*b* and 512*b* are formed on the sliding surfaces 510*a* and 512*a*; however, of course it is possible to omit the convex parts 510*b* and 512*b* of the sliding surfaces 510*a* and 512*a* and to form multiple convex parts on the guiding surfaces 562*c* and 562*d* side.

A through hole 562*e* penetrating in the left-right direction is formed on the rear end side of the main body part 562, and the fixing part 563 is fixed to the through hole 562*e*. The fixing part 563 is formed in a plate shape, and a pair of upper and lower claw parts 563*a* and 563*b* protrude from the rear end side of the fixing part 563 toward the main body part 562 side.

A hook part 563*c* protruding upward is formed at the tip end of the claw part 563*a* located on the upper end side of the fixing part 563, and a hook part 563*d* protruding downward is formed at the tip end of the claw part 563*b* located on the lower end side of the fixing part 563.

The upper surface of the hook part 563*c* is configured as a tapered surface that inclines downward as it approaches the tip end of the claw part 563*a*, and the lower surface of the hook part 563*d* is configured as a tapered surface that inclines upward as it approaches the tip end of the claw part 563*b*. Therefore, by inserting the claw parts 563*a* and 563*b* into the through hole 562*e* of the main body part 562, the claw parts 563*a* and 563*b* are elastically deformed due to sliding of the edge parts of the upper and lower surfaces of the through hole 562*e* and the tapered surfaces of the hook parts 563*c* and 563*d*; therefore, the claw parts 563*a* and 563*b* can be easily fixed to the through hole 562*e*.

The fixing part 563 is fixed to the main body part 562 by inserting the claw parts 563*a* and 563*b* into the through hole 562*e* and hooking the hook parts 563*c* and 563*d* to the edge part of the through hole 562*e*.

In the fixed state in which the fixing part 563 is fixed to the main body part 562, the base part 511 of the white key 510 is sandwiched between the rib 562*b* of the main body part 562 and the fixing part 563. Thereby, the displacement of the base part 511 in the left-right direction can be regulated by the rear guiding member 506. That is, the rear guiding member 506 has a function of guiding the rotation of the white key 510 and a function as a regulating part for regulating the displacement of the base part 511 in the left-right direction; therefore, the number of parts can be reduced.

Next, the sixth embodiment will be described with reference to FIGS. 7 and 8. In FIG. 7, (a) is a perspective view of a white key 610 and a rear guiding member 606 according to the sixth embodiment, and (b) is a partially enlarged side view of the white key 610 and the rear guiding member 606 viewed in the direction of the arrow VIIb in (a) of FIG. 7. In FIG. 8, (a) is a partially enlarged cross-sectional view of the white key 610 and the rear guiding member 606 taken along the line VIIIa-VIIIa of (b) of FIG. 7, and (b) is a partially enlarged cross-sectional view of the white key 610 taken along the line VIIIb-VIIIb of (a) of FIG. 8. Note that (b) of FIG. 8 shows a cross section in which the rear guiding member 606 is omitted.

Figure 7:
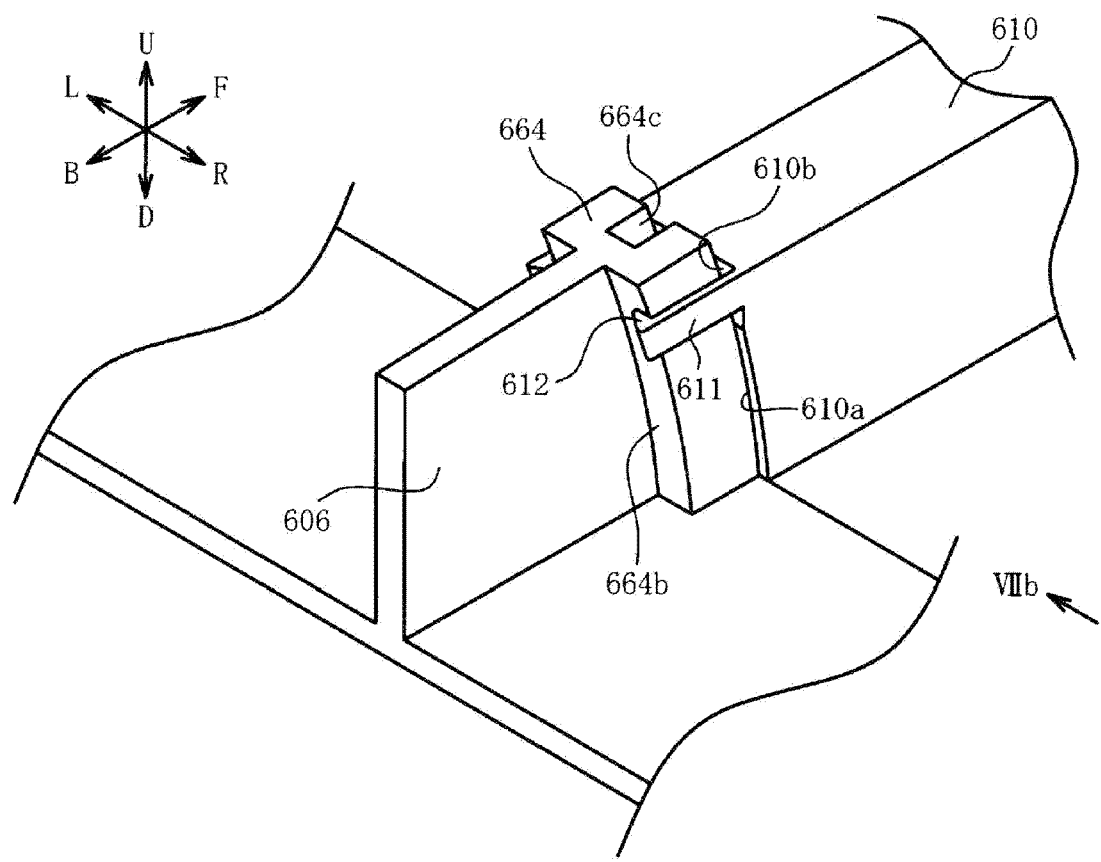
In FIG. 7, (a) is a perspective view of a white key and a rear guiding member according to the sixth embodiment, and (b) is a partially enlarged side view of the white key and the rear guiding member viewed in the direction of the arrow VIIb in (a) of FIG. 7.
Figure 7:
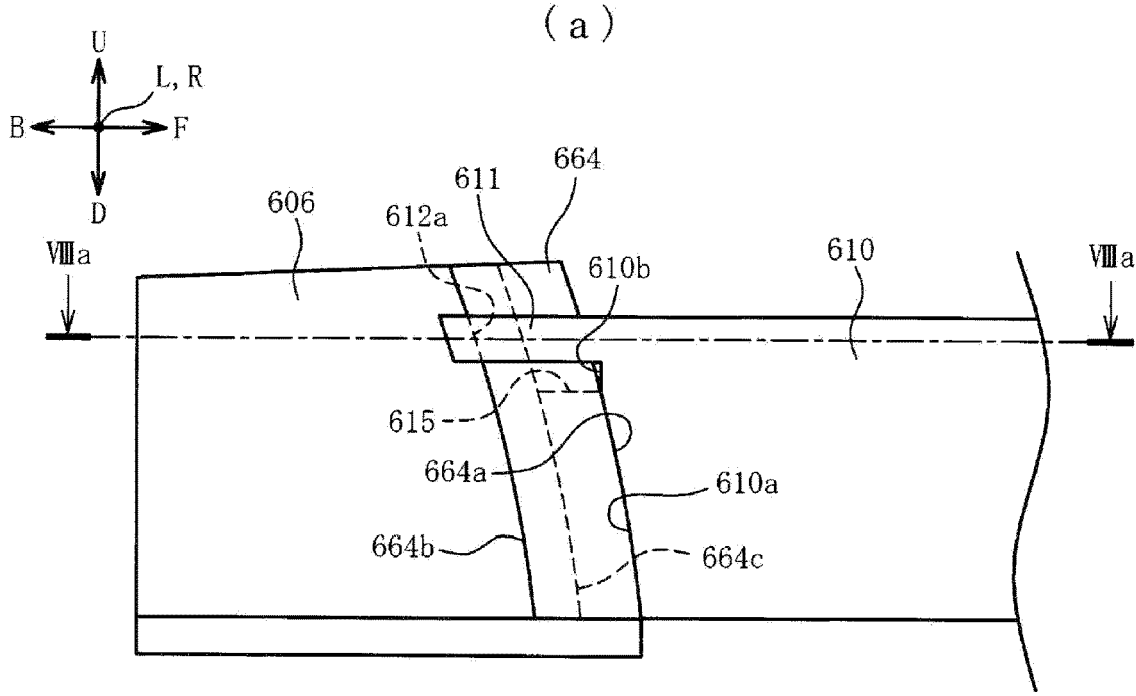
Figure 8:
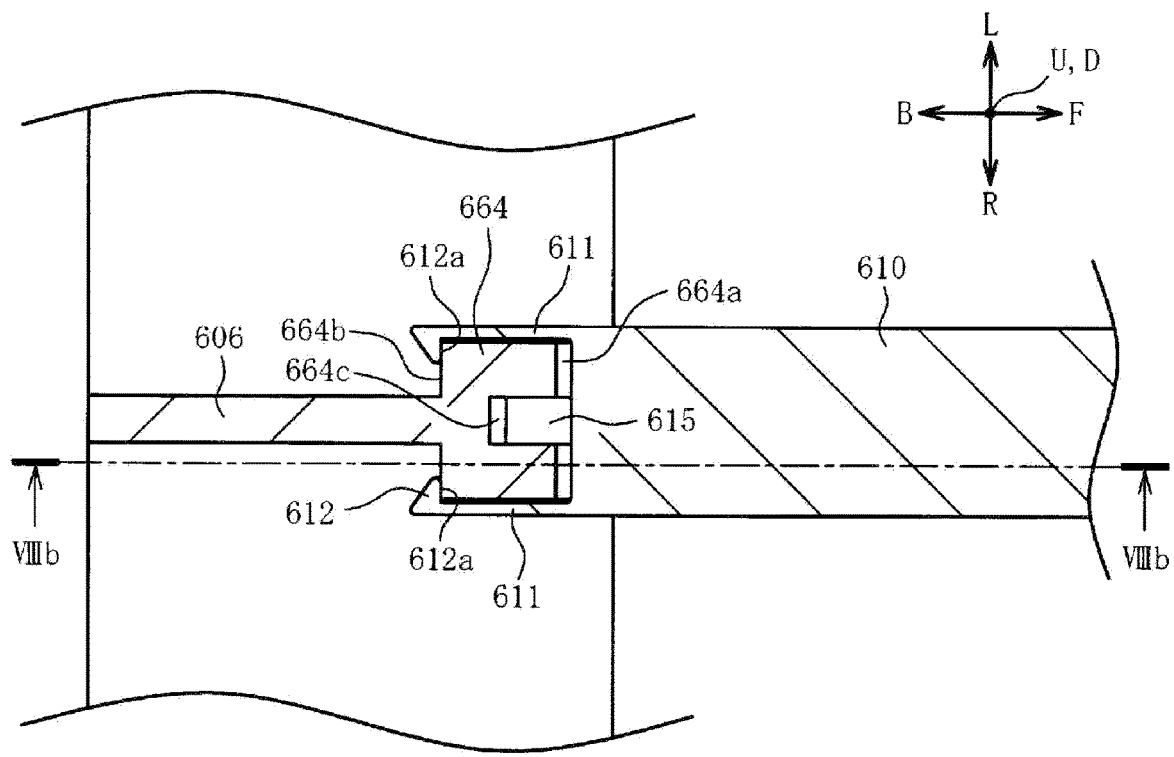
In FIG. 8, (a) is a partially enlarged cross-sectional view of the white key and the rear guiding member taken along the line VIIIa-VIIIa of (b) of FIG. 7, and (b) is a partially enlarged cross-sectional view of the white key taken along the line VIIIb-VIIIb of (a) of FIG. 8.
Figure 8:
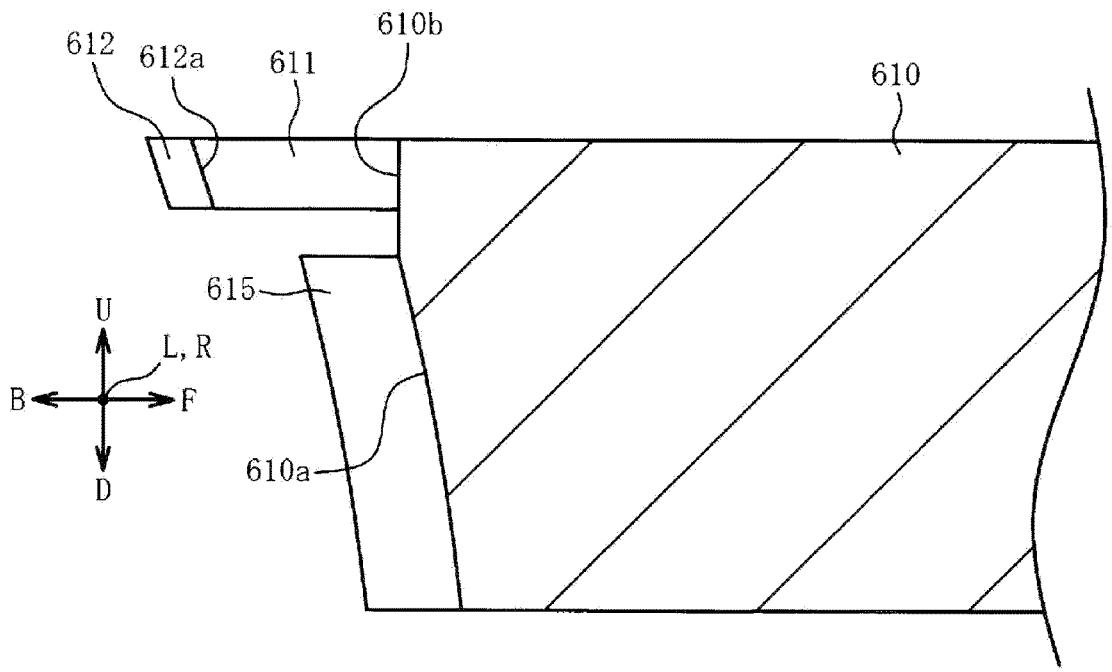

As shown in FIGS. 7 and 8, a pair of left and right base parts 611 protrudes rearward from the rear end part (end part on the arrow B side) of the white key 610 of the sixth embodiment, and a pair of sliding parts 612 protrude inward in the left-right direction (arrow L-R direction) from the tip end (rear end) of the pair of base parts 611. The front surface (the surface on the arrow F side) of the sliding part 612 is a sliding surface 612*a*, and the sliding surface 612*a* is formed in an arc shape convex to the front side.

The rear end surface of the white key 610 includes a sliding surface 610*a* located below the sliding surface 612*a* and a linear surface 610*b* in a linear shape extending upward from the upper end of the sliding surface 610*a*. The sliding surface 610*a* is formed in an arc shape convex to the front side. The sliding surfaces 610*a* and 612*a* of the white key 610 slide with respect to the rear guiding member 606 to guide the rotation of the white key 610.

The rear guiding member 606 includes a columnar part 664 in a columnar shape extending in the up-down direction. The columnar part 664 is formed to have rectangular cross section, and the front surface and the rear surface of the columnar part 664 are configured as guiding surfaces 664*a* and 664*b*. The guiding surfaces 664*a* and 664*b* are each formed in an arc shape convex to the front side.

The left-right dimension of the columnar part 664 is set to be equal to (or slightly less than) the facing distance between the pair of base parts 611, and the columnar part 664 is fitted between the facing distance of the pair of base parts 611. In the fitted state, the guiding surfaces 664*a* and 664*b* of the columnar part 664 and the sliding surfaces 610*a* and 612*a* of the white key 610 are in slidable contact with each other. As a result, the rotation of the white key 610 can be guided in a state where the displacement of the white key 610 in the front-rear direction is regulated; therefore, a reduction in operability (feeling of touch) during key pressing of the white key 610 can be suppressed.

Further, since the left-right dimension of the columnar part 664 is set to be equal to (or slightly less than) the facing distance between the pair of base parts 611, the left-right displacement of the base parts 611 can be regulated by the columnar part 664. As a result, the rear guiding member 606 can have a function of guiding the rotation of the white key 610 and a function as a regulating part for regulating the displacement of the base parts 611 (white key 610) in the left-right direction; therefore, the number of parts can be reduced.

Further, the sliding surfaces 610*a* and 612*a* and the guiding surfaces 664*a* and 664*b* are each formed in an arc shape centered on the above-described reference point P (see FIGS. 2 and 3). In this way, the entire white key 610 can be rotated around the reference point P; therefore, the rotation trajectory of the white key 610 can be made the same as the key of an acoustic piano.

Here, in the first embodiment described above, the sliding surfaces 12*a* and 12*b* (see FIGS. 2 and 3) of the white key 10 are formed in an arc shape centered on the reference point P, and it has been described that an undercut is not formed for the release in the up-down direction since the sliding surfaces 12*a* and 12*b* do not face each other. That is, when the sliding surfaces 610*a* and 612*a* are formed to face each other as in this embodiment, even if the sliding surfaces 610*a* and 612*a* are formed in an arc shape centered on the reference point P, an undercut will be formed for the release in the vertical direction when the sliding surfaces 610a and 612a are configured to partially overlap each other when viewed in the front-rear direction.

In this regard, in this embodiment, since the base part 611 and the sliding part 612 are formed on the upper end side of the white key 610, the sliding surface 610a on the rear surface of the white key 610 and the sliding surface 612a of the sliding part 612 are formed at different positions in the up-down direction (they are formed at positions where the sliding surface 610a and the sliding surface 612a do not overlap when viewed in the front-rear direction of the white key 610). As a result, even when the sliding surfaces 610a and 612a are formed to face each other, it is possible to suppress the formation of undercut for the release of the white key 610 in the up-down direction. Therefore, the manufacturing cost of the mold can be reduced.

Here, the white key 610 can be assembled to the rear guiding member 606 by fitting the base part 611 and the sliding part 612 from the upper part of the columnar part 664, but in such an assembly method, the base part 611 or the sliding part 612 may be hooked on the upper part of the columnar part 664, which requires time and effort for assembly work.

In this regard, in this embodiment, the pair of base parts 611 and the sliding parts 612 can be fitted from the front of the columnar part 664 by elastic deformation of the pair of base parts 611. Specifically, the rear surface of the pair of sliding parts 612 of the white key 610 are each configured as a tapered surface that inclines toward the front and inner sides, and the pair of base parts 611 are formed with a rigidity sufficient to be elastically deformed by sliding between these tapered surfaces and the guiding surface 664a.

Therefore, by fitting the pair of base parts 611 from the front side of the columnar part 664, the base parts 611 elastically deform due to the sliding between the left and right edge parts of the guiding surface 664a and the rear surfaces (tapered surfaces) of the sliding parts 612; therefore, the base parts 611 and the sliding parts 612 can be easily fitted into the columnar part 664. That is, since the white key 610 can be assembled by simply pushing the white key 610 toward the columnar part 664, the workability of the assembly work can be improved.

Further, a groove part 664c in a groove shape extending in the up-down direction is formed on the guiding surface 664a of the columnar part 664, and an insertion part 615 of the white key 610 is slidably inserted into the groove part 664c. The insertion part 615 is a plate-shaped body protruding rearward from the sliding surface 610a of the white key 610.

Since the groove width (left-right dimension) of the groove part 664c is set to be equal to (or slightly less than) the left-right dimension of the insertion part 615, the displacement of the white key 610 in the left-right direction can be regulated by the hook between the groove part 664c and the insertion part 615. As a result, even when the base parts 611 are configured to be elastically deformed when the white key 610 is assembled, the displacement of the white key 610 in the left-right direction can be reliably regulated by the base parts 611 and the insertion part 615.

Next, the seventh embodiment will be described with reference to FIG. 9. In FIG. 9, (a) is a perspective view of a white key 710 and a rear guiding member 706 according to the seventh embodiment, and (b) is a partially enlarged side view of the white key 710 and the rear guiding member 706 viewed in the direction of the IXb in (a) of FIG. 9, and (c) is a partially enlarged cross-sectional view of the white key 710 and the rear guiding member 706 taken along the line IXc-IXc of (b) of FIG. 9.

Figure 9:
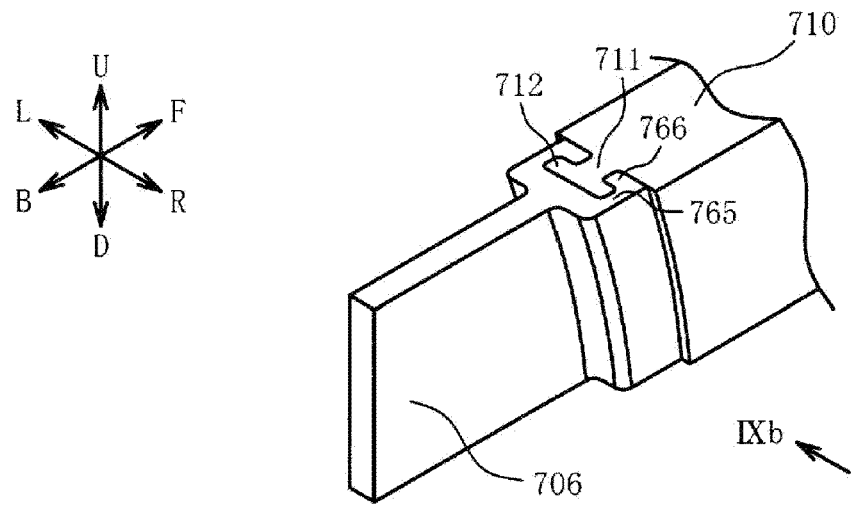
In FIG. 9, (a) is a perspective view of a white key and a rear guiding member according to the seventh embodiment, and (b) is a partially enlarged side view of the white key and the rear guiding member viewed in the direction of the IXb in (a) of FIG. 9, and (c) is a partially enlarged cross-sectional view of the white key and the rear guiding member taken along the line IXc-IXc of (b) of FIG. 9.
Figure 9:
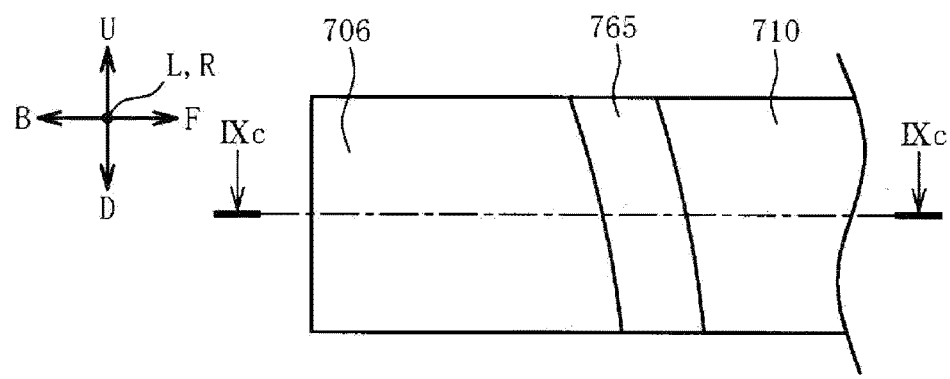
Figure 9:
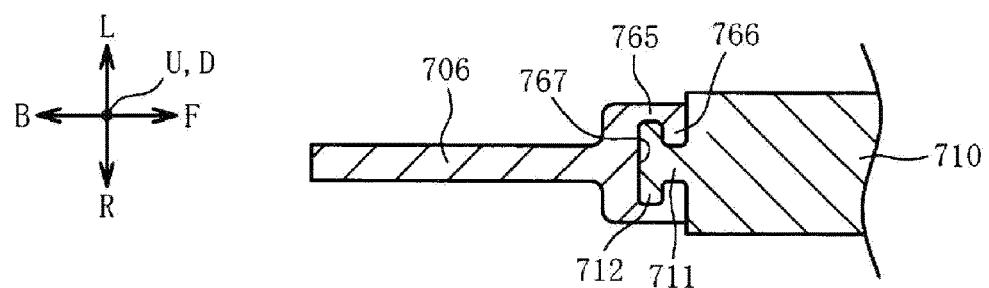

As shown in FIG. 9, a base part 711 protrudes rearward from the rear end part (end part on the arrow B side) of the white key 710 of the seventh embodiment, and a pair of sliding parts 712 protrude in the left-right direction (arrow L-R direction) from the tip end (rear end) of the base part 711.

A pair of left and right base parts 765 protrude forward from the front end part of the rear guiding member 706, and a pair of sliding parts 766 protrude inward in the left-right direction from the tip ends (front ends) of the pair of base parts 765. The sliding parts 712 of the white key 710 are slidably inserted between the pair of base parts 765, and the base 711 of the white key 710 is slidably inserted between the pair of sliding parts 766.

That is, the rear guiding member 706 is formed to have a guiding hole 767 having a T-shaped cross section (see (c) of FIG. 9) surrounded by the pair of base parts 765 and the sliding parts 766, and the base part 711 and the sliding parts 712 of the white key 710 are fitted into the guiding hole 767. Therefore, in the inner surfaces of the guiding hole 767, the surfaces facing the front and the rear are the guiding surfaces, and the front and rear surfaces of the sliding parts 712 that slide on the guiding surfaces are the sliding surfaces. The guiding surfaces and the sliding surfaces are formed in an arc shape convex to the front side. As a result, the rotation of the white key 710 can be guided in a state where the displacement of the white key 710 in the front-rear direction is regulated; therefore, a reduction in operability (feeling of touch) during key pressing of the white key 710 can be suppressed.

Further, since the facing distance between the pair of sliding parts 766 is formed to be equal to (or slightly greater than) the left-right dimension of the base part 711, the displacement of the base part 711 in the left-right direction can be regulated by the pair of sliding parts 766. As a result, the rear guiding member 706 can have a function of guiding the rotation of the white key 710 and a function as a regulating part for regulating the displacement of the base part 711 in the left-right direction; therefore, the number of parts can be reduced.

Further, the guiding surfaces of the guiding hole 767 and the sliding surfaces of the sliding part 712 are each formed in an arc shape centered on the above-described reference point P (see FIGS. 2 and 3). In this way, the entire white key 710 can be rotated around the reference point P; therefore, the rotation trajectory of the white key 710 can be made the same as the key of an acoustic piano.

Further, in this embodiment, the rear guiding member 706 and the white key 710 are integrally formed by using resin materials that do not fuse with each other in a state where the base part 711 and the sliding parts 712 are fitted in the guiding hole 767. Specifically, the manufacturing method for integrally forming the rear guiding member 706 and the white key 710 includes a first step of mold molding the rear guiding member 706 using a first resin material, and a second step of pouring a second resin material into the rear guiding member 706 formed in the first step so as to be embedded in the guiding hole 767 and mold molding the white key 710 (the base part 711 and the sliding parts 712). That is, the rear guiding member 706 and the white key 710 are coinjection molded by the first step and the second step.

Since the second resin material used is one that does not fuse with the first resin material during molding in the second step, the base part 711 and the sliding parts 712 are integrally formed into a shape that fits exactly in the guiding hole 767, and after the integral forming, the base part 711 and the sliding parts 712 can be slid through the guiding hole 767. That is, since the gap between the base part 711 and the sliding parts 712 and the guiding hole 767 can be minimized, it is possible to suppress the occurrence of rattling in the sliding between the base part 711 and the sliding parts 712 in the guiding hole 767. Consequently, a reduction in operability (feeling of touch) during key pressing of the white key 710 can be suppressed.

In this case, for example, if the up-down dimension of the base part 711 and the sliding parts 712 is longer than that of the guiding hole 767, it is necessary to provide a cavity for forming the base part 711 and the sliding parts 712 in the mold at the time of molding in the second step, which complicates the shape of the mold. Further, in such a configuration, since the outer shapes of the base part 711 and the sliding parts 712 are determined by the shape of the cavity of the mold, it becomes difficult to form the base part 711 and the sliding parts 712 to the dimensions that fit exactly in the guiding hole 767, and rattling is likely to occur in the sliding between the base part 711 and the sliding parts 712 in the guiding hole 767.

In this regard, in this embodiment, the front end part of the rear guiding member 706 and the rear end part of the white key 710 are substantially flush with each other on both the upper and lower sides. That is, the up-down dimensions of the base part 711 and the sliding parts 712 are set to be equal to the up-down dimension of the guiding hole 767. As a result, the overall outer shape of the base part 711 and the sliding parts 712 is determined by the shape of the guiding hole 767, so it is not necessary to provide a cavity for forming the base part 711 and the sliding parts 712 in the mold at the time of molding in the second step.

Further, since the overall outer shape of the base part 711 and the sliding parts 712 is determined by the shape of the guiding hole 767, the base part 711 and the sliding parts 712 can be formed to have dimensions that exactly fit in the guiding hole 767. Therefore, the shape of the mold at the time of molding in the second step can be simplified, and it is possible to suppress the occurrence of rattling in the sliding between the base part 711 and the sliding parts 712 in the guiding hole 767. Consequently, a reduction in operability (feeling of touch) during key pressing of the white key 710 can be suppressed while the manufacturing cost of the mold is reduced.

As a method for preventing the rear guiding member 706 and the white key 710 from fusing to each other (or separating after molding) during molding in the second step, for example, a method in which a material having a melting point higher than that of the second resin material is used as the second resin material (using resin materials that are incompatible with each other) is exemplified (for example, Japanese Patent Laid-Open Publications No. S62-128719 and No. 2003-145575).

Although the disclosure has been described based on the above embodiments, the disclosure is not limited to the above embodiments, and it can be easily inferred that various improvements and modifications may be made within the scope that does not deviate from the spirit of the disclosure.

In each of the above embodiments, the case where the keyboard devices 1, 201, 301, 401 are configured as an electronic piano has been described, but the disclosure is not necessarily limited thereto. For example, the technical idea of each of the above embodiments can be applied to other electronic musical instruments (for example, electronic organs, synthesizers, accordions, and the like).

In the above embodiments, the hammer 7 is exemplified as a returning part for returning the key 2 to the initial position before the key pressing, but the disclosure is not necessarily limited thereto. For example, the key 2 may be returned to the initial position by an elastic body such as a spring.

In each of the above embodiments, the case where the receiving parts 73 and 473 are located on the front side of the shafts 70 and 470 of the hammers 7 and 407 has been described, but the disclosure is not necessarily limited thereto. For example, the receiving parts 73 and 473 may be located on the rear side of the shafts 70 and 470 of the hammers 7 and 407, as long as the protruding parts 13 and 413 may be formed at positions capable of pushing the receiving parts 73 and 473 at the time of key pressing. Therefore, for example, in each of the above embodiments, the contact position between the receiving parts 73 and 473 and the protruding parts 13 and 413 may be located on the rear side with respect to the center in the front-rear direction of the key.

In each of the above embodiments, the case where the guiding surface and the sliding surface are formed in an arc shape centered on the reference point P located on the rear lower side of the sliding surface has been described, but the disclosure is not necessarily limited thereto. For example, the guiding surface and the sliding surface may be formed in an arc shape centered on a reference point at a position overlapping the sliding surface in the front-rear direction.

In each of the above embodiments, the case where the left-right displacement of the base parts 11, 511, 611 and 711 is regulated by the rear guiding members 6, 206, 406, 506, 606 and 706 has been described, but the disclosure is not necessarily limited thereto. The rear guiding member may have at least a function of guiding the rotation while regulating the front-rear displacement of the key 2. Therefore, for example, in the first to fourth embodiments, a gap is formed between the second guiding parts 61 and 261 and the base part 11, and the left-right displacement of the base part 11 (key 2) may be regulated by other members. Similarly, in the fifth to seventh embodiments, the left-right displacement of the base parts 511, 611 and 711 (key 2) may be regulated by a member other than the rear guiding members 506, 606 and 706.

In the first embodiment, the case where the first guiding part 60 and the second guiding part 61 are detachably configured on the base member 5 has been described. However, for example, the fixing positions of the first guiding part 60 and the second guiding part 61 with respect to the base member 5 may be made variable in the front-rear direction so that the width of the gap between the guiding surface 60a and the convex part 61b may be adjusted.

In the first embodiment, the case has been described in which a gap is formed between the first guiding part 60 and the second guiding part 61, and the sliding part 12 of the key 2 is inserted into the gap, but the disclosure is not necessarily limited thereto. For example, a groove (a recess or a through hole) corresponding to the gap between the first guiding part 60 and the second guiding part 61 may be formed on the key 2 side, and a convex part (which slides along the groove) corresponding to the sliding part 12 may be formed on the rear guiding member 6 side.

In the first embodiment, the case where the pair of base parts 11 are connected by the sliding part 12 extending inward in the left-right direction from the pair of base parts 11 has been described, but the disclosure is not necessarily limited thereto. For example, the sliding part 12 may be divided so that a gap is formed between the sliding part 12 of one base part 11 and the sliding part 12 of the other base part 11. Further, the sliding part 12 may be configured to protrude outward in the left-right direction of the base part 11. In this case, a configuration corresponding to the rear guiding member 6 may be provided on the outside of the base parts 11.

In the first embodiment, the case where multiple convex parts 61b sliding along the sliding surface 12b are formed on the guiding surface 61a has been described, but the disclosure is not necessarily limited thereto. For example, the guiding surface 61a may be configured as an arc surface. Further, the guiding surface 60a and the sliding surfaces 12a and 12b may be provided with a configuration corresponding to the convex part, and the configuration corresponding to the convex part may be provided on the guiding surface and the sliding surface of another embodiment. In any case, if a convex part is provided on either the guiding surface or the sliding surface that slides with each other, the other may be formed as an arc surface.

In the second embodiment, the case where the return force from the hammer 7 is applied to the key 2 in the area between the pair of guiding surfaces 261a and 252a has been described, but the disclosure is not necessarily limited thereto. For example, it may be configured that the return force from the hammer 7 is applied to the key 2 in the area on the front side of the pair of guiding surfaces 261a and 252a.

In the second embodiment, the case where the guiding surface 252a of the front guiding member 252 and the sliding surface 14c of the key release stopper 14 slide has been described, but the disclosure is not necessarily limited thereto. For example, the guiding surface of the front guiding member 252 may be slid along a part of the key 2 other than the key release stopper 14.

In the second embodiment, the case has been described in which the second guiding part 261 of the rear guiding member 206 regulates the displacement of the key 2 to the front side, and the front guiding member 252 regulates the displacement of the key 2 to the rear side, but the disclosure is not necessarily limited thereto. For example, it may be configured that the rear guiding member 206 regulate the displacement of the key 2 to the rear side, and the front guiding member 252 regulate the displacement of the key 2 to the front side. That is, if the configuration is such that the rotation can be guided while the displacement of the key 2 in the front-rear direction is regulated, the disposition of the sliding surface and the guiding surface may be set as appropriate.

In the fifth embodiment, the case has been described in which the key 2 is provided with the base part 511 and the sliding part 512, and the rear guiding member 506 is provided with the main body part 562 and the fixing part 563, but the disclosure is not necessarily limited thereto. For example, it may be configured that a configuration corresponding to the base part 511 and the sliding part 512 is provided on the rear guiding member 506 side, and a configuration corresponding to the main body part 562 and the fixing part 563 is provided on the key 2 side.

In the sixth embodiment, the case has been described in which the key 2 is provided with the base part 611 and the sliding part 612, and the rear guiding member 606 is provided with the columnar part 664, but the disclosure is not necessarily limited thereto. For example, it may be configured that a configuration corresponding to the base part 611 and the sliding part 612 is provided on the rear guiding member 606 side, and a configuration corresponding to the columnar part 664 is provided on the key 2 side.

In the sixth embodiment, the case where the sliding surfaces 610a and 612a are formed at different positions in the up-down direction has been described, but the disclosure is not necessarily limited thereto. For example, the sliding surfaces 610a and 612a may be formed at positions where they overlap when viewed in the front-rear direction.

In the sixth embodiment, the rear surface of the sliding part 612 is configured as a tapered surface, and the pair of base parts 611 are elastically deformed by the sliding between the left and right edges of the guiding surface 664a and the tapered surface of the sliding part 612, but the disclosure is not necessarily limited thereto. For example, it may be configured that the tapered surface of the sliding part 612 is omitted (or in addition to the tapered surface), and tapered surfaces are formed on the left and right edge parts of the guiding surface 664a, and the pair of base parts 611 may be elastically deformed by the sliding between the tapered surfaces on the guiding surface 664a side and the sliding part 612.

In the sixth embodiment, the case has been described in which the groove part 664c in a groove shape extending in the up-down direction is formed on the guiding surface 664a of the columnar part 664, and the insertion part 615 of the key 2 is inserted into the groove part 664c, but the disclosure is not necessarily limited thereto. For example, it may be configured that the groove part 664c or the insertion part 615 is omitted, or it may be configured that a configuration corresponding to the groove part 664c is provided on the key 2 side, and a configuration corresponding to the insertion part 615 is provided on the rear guiding member 606 side.

In the seventh embodiment, the case has been described in which the key 2 is provided with the base part 711 and the sliding part 712, and the rear guiding member 706 is provided with the base part 765 and the sliding part 766 (guiding hole 767), but the disclosure is not necessarily limited thereto. For example, it may be configured that a configuration corresponding to the base part 711 and the sliding part 712 is provided on the rear guiding member 706 side, and a configuration corresponding to the base part 765 and the sliding part 766 (guiding hole 767) is provided on the key 2 side.

In the seventh embodiment, the case where the rear guiding member 706 and the white key 710 are integrally formed in a state where the base part 711 and the sliding part 712 are fitted in the guiding hole 767 has been described, but the disclosure is not necessarily limited thereto. For example, the rear guiding member 706 and the white key 710 may be molded separately, and the base part 711 and the sliding part 712 may be fitted into the guiding hole 767 after the molding.

In the seventh embodiment, the case where the up-down dimension of the base part 711 and the sliding part 712 are set to be equal to the up-down dimension of the guiding hole 767 has been described, but the disclosure is not necessarily limited thereto. For example, the up-down dimension of the base part 711 and the sliding part 712 may be set longer (or shorter) than the up-down dimension of the guiding hole 767.

What is claimed is:

1. A keyboard device comprising:
   a guiding member; and
   a plurality of keys whose rotational movement is guided by the guiding member,
   wherein the guiding member comprises a pair of guiding surfaces that, in a side view of the key, face a front side and a rear side and are formed along an arc convex to the front side, the key comprises a pair of sliding surfaces configured to be slidable on the pair of guiding surfaces, and a rotation of the key is guided in a state where a displacement of the key in a front-rear direction is regulated by sliding of the guiding surfaces and the sliding surfaces.

2. The keyboard device according to claim 1, further comprising a return part for applying a return force to the key to return to an initial position before key pressing, wherein the keys comprise a white key and a black key, and the return force from the return part is applied to a part of the white key located in front of the black key.

3. The keyboard device according to claim 1, wherein one of the guiding surface and the sliding surface is configured as an arc surface convex to the front side in the side view of the key, and the other of the guiding surface and the sliding surface comprises a plurality of convex parts configured to protrude toward the arc surface and to be slidable on the arc surface.

4. The keyboard device according to claim 3, wherein in a case where the pair of guiding surfaces each comprise the convex part, the convex part of one of the guiding surfaces and the convex part of the other of the guiding surfaces are formed at different positions in an up-down direction, and in a case where the pair of sliding surfaces each comprise the convex part, the convex part of one of the sliding surfaces and the convex part of the other of the sliding surfaces are formed at different positions in the up-down direction.

5. The keyboard device according to claim 1, wherein one of the pair of guiding surfaces is located further to the rear side with respect to a center of the key in the front-rear direction, and the other of the pair of guiding surfaces is located further to the front side with respect to the center of the key in the front-rear direction.

6. The keyboard device according to claim 5, further comprising a return part for applying a return force to the key to return to an initial position before key pressing, and the return force from the return part is applied to the key in an area between the pair of guiding surfaces.

7. The keyboard device according to claim 1, wherein the key comprises:

a base part extending to the rear side from a rear surface of the key; and a sliding part formed to protrude in a left-right direction from a tip end of the base part, wherein the sliding surface is formed on at least one of a rear surface and a front surface of the sliding part, and the guiding member comprises:

a regulating part configured to be able to regulate a displacement of the base part in the left-right direction.

8. The keyboard device according to claim 7, wherein the sliding surface is configured as an arc surface centered on a reference point located on a rear lower side of the sliding part in the side view of the key, and the sliding part has a shape that does not have an undercut for mold release in the up-down direction.

9. The keyboard device according to claim 7, wherein the guiding member comprises a columnar part in a columnar shape extending in the up-down direction, the guiding surfaces are formed on a front surface and a rear surface of the columnar part, the sliding surfaces are formed on the rear surface of the key and the front surface of the sliding part, the key comprises a pair of the base parts and the sliding parts that are spaced apart for a predetermined distance in the left-right direction, and the pair of base parts and sliding parts are configured to be able to be fitted from the front side of the columnar part by elastic deformation of the pair of base parts.

10. The keyboard device according to claim 9, wherein the columnar part comprises a groove part in a groove shape formed on the front surface of the columnar part and extending in the up-down direction, the key comprises an insertion part that protrudes to the rear side from the rear surface of the key and is slidably inserted into the groove part, and a displacement of the key in the left-right direction is regulated by hooking between the groove part and the insertion part.

11. The keyboard device according to claim 1, wherein one of a front surface of the guiding member and the rear surface of the key is provided with:

a base part extending in the front-rear direction; and a sliding part formed to protrude in the left-right direction from a tip end of the base part, wherein the sliding surfaces or the guiding surfaces are formed on both a front surface and a rear surface of the sliding part, and the other of the front surface of the guiding member and the rear surface of the key is provided with:

a guiding hole in which the base part and the sliding part are slidably fitted and the sliding surfaces or the guiding surfaces are formed on both a front surface and a rear surface of the guiding hole, and the guiding member and the key are integrally formed by using resin materials that do not fuse with each other in a state where the base part and the sliding part fitted in the guiding hole.

12. The keyboard device according to claim 11, wherein dimensions of the guiding hole and the base part and the sliding part in the up-down direction are set to be equal.

13. A keyboard device comprising:

a guiding member; and a plurality of keys whose rotational movement is guided by the guiding member, wherein the guiding member comprises a pair of guiding surfaces that, in a side view of the key, face a front side and a rear side and are formed along an arc convex to the front side, and the key comprises a pair of sliding surfaces configured to be slidable on the pair of guiding surfaces.

14. The keyboard device according to claim 13, further comprising a return part for applying a return force to the key to return to an initial position before key pressing, wherein the keys comprise a white key and a black key, and the return force from the return part is applied to a part of the white key located in front of the black key.

15. The keyboard device according to claim 13, wherein one of the guiding surface and the sliding surface is configured as an arc surface convex to the front side in the side view of the key, and the other of the guiding surface and the sliding surface comprises a plurality of convex parts configured to protrude toward the arc surface and to be slidable on the arc surface.

16. The keyboard device according to claim 15, wherein in a case where the pair of guiding surfaces each comprise the convex part, the convex part of one of the guiding surfaces and the convex part of the other of the guiding surfaces are formed at different positions in an up-down direction, and in a case where the pair of sliding surfaces each comprise the convex part, the convex part of one of the sliding surfaces and the convex part of the other of the sliding surfaces are formed at different positions in the up-down direction.

17. The keyboard device according to claim 13, wherein one of the pair of guiding surfaces is located further to the rear side with respect to a center of the key in the front-rear direction, and the other of the pair of guiding surfaces is located further to the front side with respect to the center of the key in the front-rear direction.

18. The keyboard device according to claim 17, further comprising a return part for applying a return force to the key to return to an initial position before key pressing, and the return force from the return part is applied to the key in an area between the pair of guiding surfaces.

19. The keyboard device according to claim 13, wherein the key comprises:

a base part extending to the rear side from a rear surface of the key; and a sliding part formed to protrude in a left-right direction from a tip end of the base part, wherein the sliding surface is formed on at least one of a rear surface and a front surface of the sliding part, and the guiding member comprises:

a regulating part configured to be able to regulate a displacement of the base part in the left-right direction.

20. The keyboard device according to claim 19, wherein the sliding surface is configured as an arc surface centered on a reference point located on a rear lower side of the sliding part in the side view of the key, and the sliding part has a shape that does not have an undercut for mold release in the up-down direction.

\* \* \* \* \*